(12) United States Patent
Powers et al.

(10) Patent No.: US 7,039,836 B2
(45) Date of Patent: May 2, 2006

(54) HIGH PERFORMANCE COMPUTER SYSTEM HAVING A FIRMWARE ERROR QUEUE AND AUTOMATIC ERROR HANDLING

(75) Inventors: Richard Dickert Powers, Highland Village, TX (US); Bradley Gordon Culter, Dallas, TX (US); Scott Lynn Michaelis, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 10/404,490

(22) Filed: Apr. 1, 2003

(65) Prior Publication Data

US 2004/0199832 A1 Oct. 7, 2004

(51) Int. Cl.
*G06F 11/00* (2006.01)
(52) U.S. Cl. ........................................................ 714/48
(58) Field of Classification Search ................. 714/48; 712/16–20
See application file for complete search history.

(56) References Cited

U.S. PATENT DOCUMENTS

| | | | | |
|---|---|---|---|---|
| 5,023,776 A | * | 6/1991 | Gregor | 711/122 |
| 6,594,785 B1 | * | 7/2003 | Gilbertson et al. | 714/48 |
| 6,701,464 B1 | * | 3/2004 | Austen et al. | 714/48 |
| 6,708,291 B1 | * | 3/2004 | Kidder | 714/39 |
| 2004/0019835 A1 | * | 1/2004 | Marisetty et al. | 714/48 |

* cited by examiner

*Primary Examiner*—Scott Baderman
*Assistant Examiner*—Brian Assessor

(57) ABSTRACT

A cellular computer system is constructed of a plurality of cells. Each cell has a memory system, a plurality of processors capable of accessing the memory system, a system communication interface coupled to processors, and a cell error queue maintained by a processor within the memory system. The system communication interface of each cell is coupled to other cells of the system. A first cell of the plurality of cells is a master cell that maintains a partition error queue and is capable of receiving into the partition error queue error descriptors from the cell error queue of a second cell of the plurality of cells.

9 Claims, 3 Drawing Sheets

HIGH PERFORMANCE COMPUTER SYSTEM HAVING A FIRMWARE ERROR QUEUE AND AUTOMATIC ERROR HANDLING

FIELD OF THE INVENTION

The invention applies to the field of error handling in high performance computer systems.

BACKGROUND OF THE INVENTION

Cellular Computer Systems

Modern, high performance, computer systems typically incorporate multiple processors. It is known that some computer systems may embody primary processors of multiple instruction set types, multiple processor systems having primary processors of multiple instruction set architectures (ISAs) are known herein as heterogeneous computer systems.

In addition to primary processors, upon which operating system and user programs run, there are typically additional embedded processors of additional types. Embedded processors are typically provided for control of specific hardware devices, such as disk drives, in the system. In a computer system, embedded processors may perform system management functions as monitoring of primary processor voltages and temperatures, control of cooling subsystems, as well as boot-time configuration of various system components.

A family of high performance heterogeneous computer systems from Hewlett-Packard is capable of being configured to use primary processors of two or more types, including the Intel Itanium and PA8800 instruction set architectures.

In this family of computer systems, a field replaceable "cell" has several primary processor circuits of the same type, together with memory, circuitry for communicating with other cells over a backplane bus, input output (I/O) bus interface circuitry, JTAG (Joint Test Action Group) scan circuitry, and other circuitry. There may be one or more additional embedded processors in each cell to perform system management functions.

One or more cells, which may but need not be of the same type, are installed into a backplane. A heterogeneous computer system is formed when cells having more than one type of processors are inserted into the backplane; a homogeneous computer system is formed if all cells have processors of the same type.

This family of computer systems supports simultaneous execution of multiple operating systems, including multiprocessor versions of Windows-NT, Unix, VMS, and Linux. Multiple instances of each system are also supported. Each operating system instance operates in a partition of a computer system.

At system boot time, a set of processors of a particular type are assigned to operate in each partition. These processors may belong to more than one cell, but must all be of the same ISA. As each operating system boots, or reinitializes, these processors become aware of each other and appropriate task routing and assignment datastructures built in system memory, a process known herein as a Rendezvous of these processors.

During Rendezvous, a processor of each cell is designated a master processor for that cell. One cell of each partition is designated as the master cell for the partition.

Firmware

Most computer systems, including cellular computer systems, have firmware that executes at boot time on each processor. This firmware is responsible for performing self testing, for conducting interprocessor communications including those involved in the Rendezvous and loading the operating system. Firmware is particularly responsible for boot-time operation, once an operating system is loaded some firmware functions may be replaced by related operating system functions.

Error Detection and Handling

Firmware of such computer systems is generally capable of detecting errors that may arise from many causes. As an example, these causes may include problems detected during self-test, interprocessor communication problems, attempts to load incompatible code, rendezvous with processors of an incompatible instruction set architecture, and other errors. Cellular computer systems often recognize multiple errors from single causes, for example corrupt interprocessor communications can be recognized by each of the processors involved.

Many computer systems have firmware capable of handling single errors.

A common method of error reporting is the return-value mechanism. With this mechanism, each subroutine capable of detecting an error returns either zero or an error flag in a register.

Many routines in Unix and similar operating systems combine a single-flag version of the return-value mechanism with an error code stored in a known location. This error code, or ERRNO, can be read by a calling program to obtain some stored information about an error.

Both the return-value mechanism and its ERRNO enhancement are capable of passing only limited information about an error.

In a large, multicellular, computer system, it is desirable to provide the ability to flexibly handle multiple errors. It is desirable to pass sufficient information about an error to other firmware components to permit proper diagnosis and, if possible, automatic recovery from the error. It is also desirable to automatically handle and recover from many potential errors so that at least partial system operation may continue.

SUMMARY

A firmware error handling queue system for a computer system maintains an error queue as a First-In, First-Out (FIFO) list of error records. Each error record that may be linked to the queue has at least two fields, a scope field indicating the portions of the computer system in which the error arose, and an error identification field identifying the particular error.

A particular embodiment has automatic error diagnosis and recovery routines at several levels of the system. There are processor, cell, and partition-level diagnosis recovery routines provided in the firmware.

In a particular embodiment, error handling is implemented on primary processors of the system. In an embodiment, each primary processor has its own error queue in memory. These queues are located in a portion of memory of the cell where they can be accessed by the master processor of the cell.

In a particular embodiment, the master processor of each cell has an error-handler. This master processor removes errors from the error queues of each processor at a predetermined rate and processes them. For all cells other than the master cell of each partition, the master processor submits errors to the error queue of the master processor of the master cell of the partition.

DETAILED DESCRIPTION OF THE EMBODIMENTS

Figure 1:
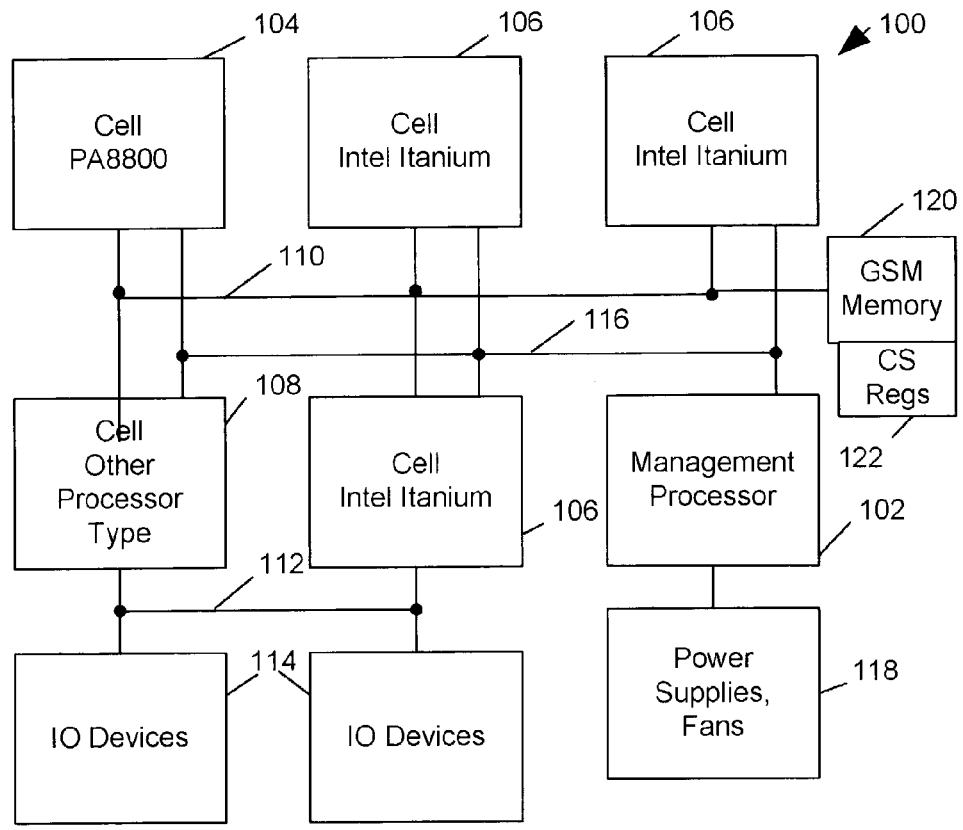
FIG. 1 is a block diagram of a heterogeneous computing system.
Figure 2:
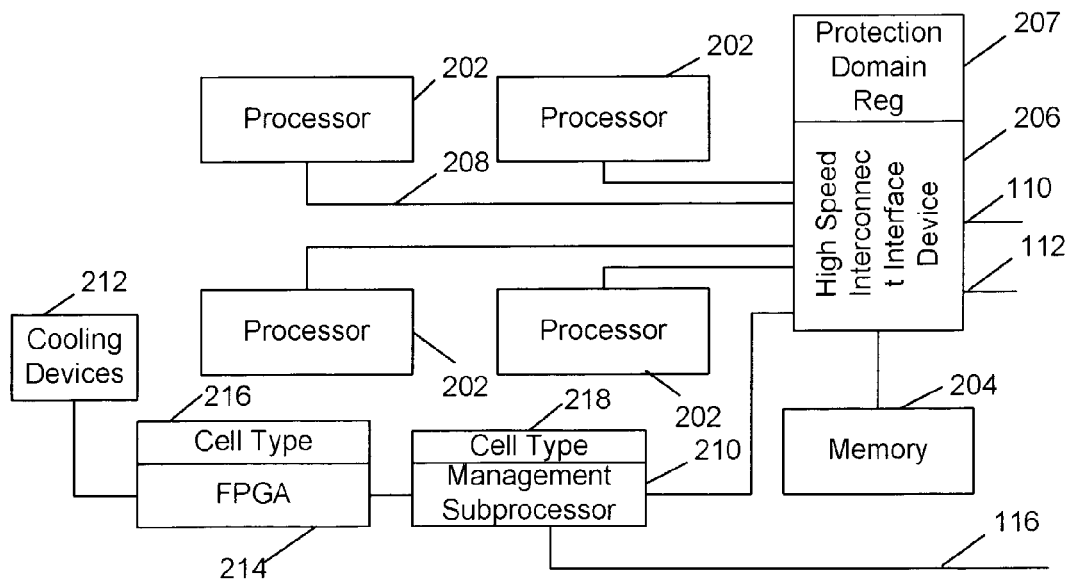
FIG. 2, is a block diagram of a cell for a heterogeneous computing system.
Figure 3:
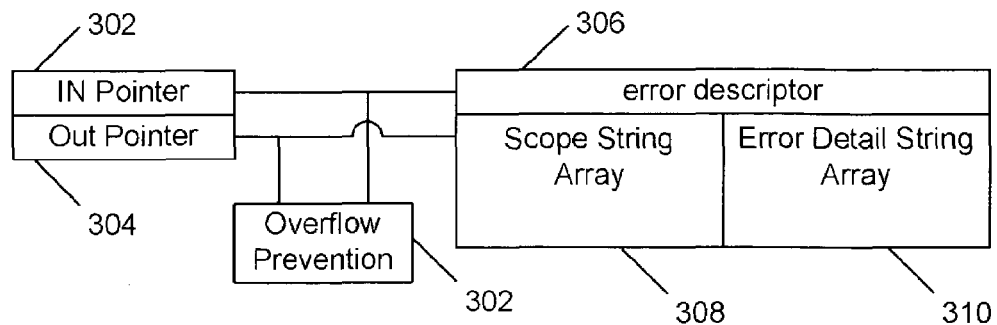
FIG. 3, is a diagram of each error queue data structure.

A heterogeneous computer system 100 (FIG. 1) includes a system management processor 102, and two or more processor cells 104, 106, and 108 of two or more types. Processor cells 104, 106, and 108 each incorporate primary processors 202 (FIG. 2). Processor cells 104 incorporate primary processors of a first ISA type, while processor cells 106 embody processors of a second ISA type. In a particular embodiment, processor cells 104 embody processors 202 of the PA8800 type, while processor cells 106 embody processors 202 of the Intel Itanium type. Additional processor cells 108 may exist in the system 100, having the same or additional types of processors thereon.

Cells of the system 100 are interconnected through high-speed interconnect 110. High-speed interconnect 110 provides for communications between cells. Some cells of the system 100 may also be coupled to I/O (Input/Output) interconnect 112. I/O interconnect 112 provides a path for communication between cells of the system, such as cell 108, and I/O devices 114. I/O devices 114 may include disk drives and network interface devices, as well as other peripherals.

Cells 104, 106, and 108 of the system 100 are interconnected to the management processor 102 over a management interconnect 116. Management processor 102 is also coupled to control power supplies and fans 118.

In addition to primary processors 202, each cell (FIG. 2) also incorporates a memory system 204, and a high-speed interconnect interface device 206. In a particular embodiment, high speed interconnect interface device 206 includes crossbar switching circuits, bus bridging circuits, and memory control circuits. In one embodiment, high speed interconnect interface device 206 includes a protection domain register 207 for specifying a protection domain to which the cell is assigned. High speed interconnect interface device 206 interfaces processor busses, such as processor bus 208, from primary processors 202 to memory system 204 and to at least one high-speed system interconnect 110, and I/O interconnect 112.

Memory 204 of each cell is accessible from processors 202 of that cell, and from the high speed interconnect 110. The high speed interconnect interface device 207 is capable of using protection domain register 207 to limit access to memory 204 by high speed interconnect 110 to references originating at other cells assigned to the same protection domain specified in protection domain register 207.

A portion of system memory, which in an exemplary embodiment is memory 120 separate from the cells, may be configured as Globally Shared Memory (GSM). In an alternative embodiment, a portion of memory 204 of one or more cells is configurable to serve as GSM memory. GSM memory 120 includes Coherency Set (CS) registers whereby a set of protection domains may be specified for each of several regions of GSM memory. References to regions of GSM memory by processors of a protection domain not specifically permitted by CS registers associated with those regions are rejected.

In an embodiment, primary processors 202 of each cell each are large integrated circuits each including multiple CPUs (Central Processor Units) together with multiple levels of cache memory. In an embodiment each processor 202 has four CPUs. It is anticipated that the number of effective CPUs per processor 202 may be greater than four.

Each cell also has a small management subprocessor 210, which in an exemplary embodiment is a microcontroller of the Intel 80251 type. It is anticipated that management subprocessor 210 may be a microcontroller of the Intel 8096, Motorola 6811 or 6805 families, or of another type as known in the art. Management subprocessor 210 is adapted for communication over management interconnect 116. In a particular embodiment, management subprocessor 210 controls cell-level cooling devices 212, and is capable of monitoring temperatures of the cells primary processors 202.

In a particular embodiment, management subprocessor 210 communicates to cooling devices 212 and other devices (not shown) through an FPGA (Field Programmable Gate Array) 214. In this embodiment, FPGA 214 includes a cell type register 216. In an alternative embodiment, adaptable to embodiments wherein management subprocessor 210 connects with cooling devices 210 without an FPGA 214, a cell type register 218 is incorporated into code of management subprocessor 210. In a particular embodiment, cell type register contents are accessible to primary processors 202 of the cell.

Each error queue has an input pointer 302 and an output pointer 304. The error queue is a circular buffer having capacity for a predetermined number of error descriptors 306. Each error descriptor 306 has at least two fields, an error scope field, stored in an error scope array 308 and an error detail field, stored in an error detail array 310. The error scope field is used to store information about where in the system an error originated, and the error detail field is used to store information about the cause of the error. In a particular embodiment, the error scope fields of error descriptors store an identity of the processor and cell within which each error originated.

Multithreaded processor integrated circuits are known in the art. Multithreaded processors are those processors that are capable of executing several instruction streams using some processor components dedicated to each stream, and some processor components shared among the streams. While multithreaded processors are not wholly independent in hardware, they appear to software as multiple independent processors and require programming techniques similar to those used with multiple processors. For purposes of this document, a multithreaded processor is considered a plurality of processors.

Figure 4:
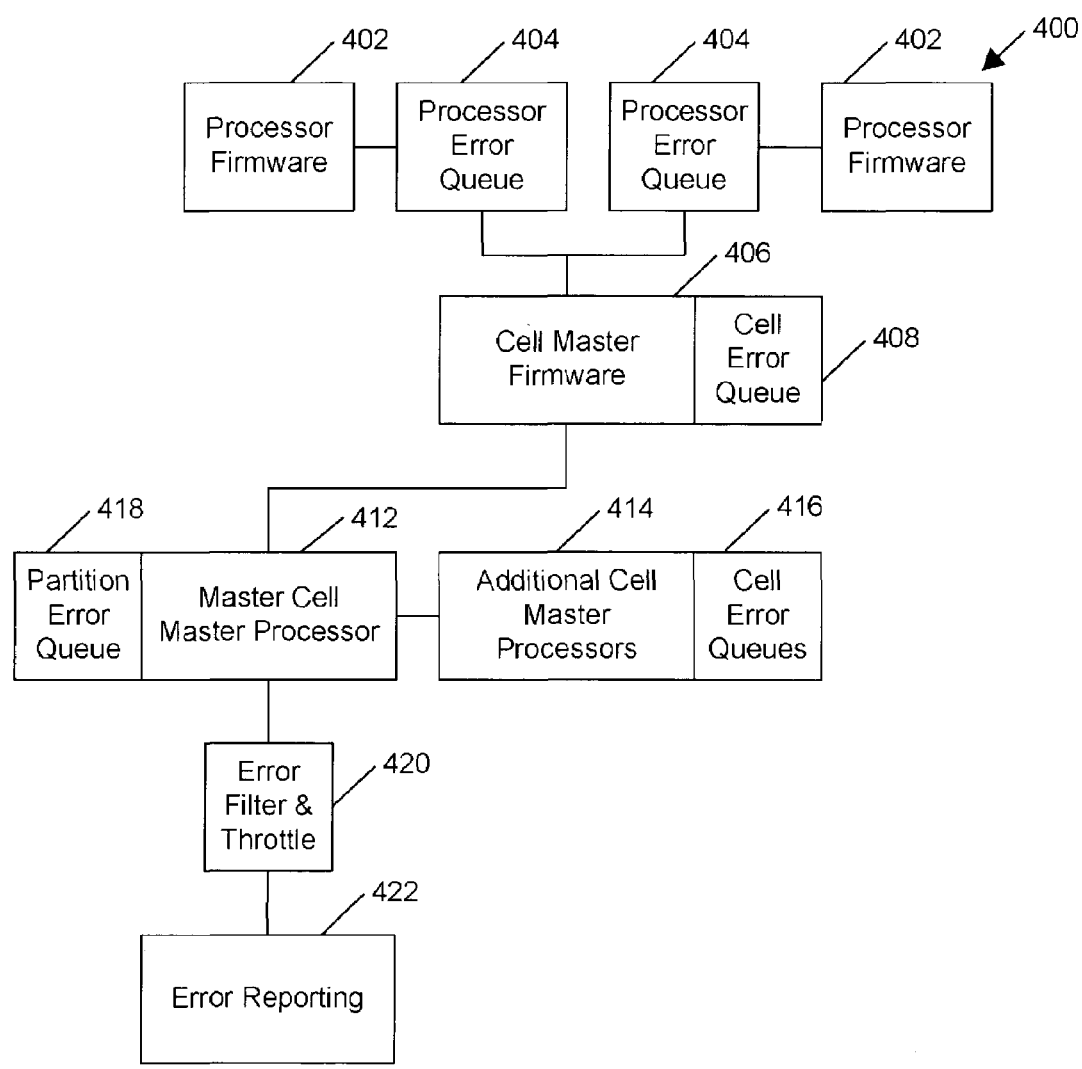
FIG. 4, is a block diagram of error handling firmware of a partition of the heterogeneous computing system.

Error handling firmware of a partition is illustrated in FIG. 4. Each processor 202 of a cell 104 operates error handling firmware 402. When an error is detected, firmware 402 inserts error descriptors in a processor error queue 404. A particular processor of processors 202 operates cell master firmware 406. Cell master firmware 406 removes error descriptors from processor error queues 404 maintained by non-master processors of the cell. These error descriptors are transferred to a cell master error queue 408. Additional error descriptors may be detected by the cell master firmware 406, and inserted directly into the cell master error queue 408.

During operation, the cell master firmware is coupled to master cell firmware 412, executing on a master cell of cells 104 of a partition. The master cell firmware 412 is also coupled to cell master firmwares 414 of any other cells 104 that may exist in the partition. Cell master firmware 406, and cell master firmwares 414, transfer error descriptors from cell master error queue 408, and cell master error queues 416, to partition error queue 418. Partition error queue 418 is maintained by master cell firmware 414. Master cell firmware 414 also retrieves error descriptors from partition error queue 418 and applies an error filter and throttle 420 before reporting 422 the errors.

Error filter and throttle 420 reduces the quantity of error descriptors reported by:
  deleting low-priority error descriptors when large numbers of higher-priority error descriptors are present,
  deleting redundant error descriptors when large numbers of similar types of error descriptors are present, and
  reducing error descriptor reporting rate to a rate that can be viewed on a terminal.

Figure 5:
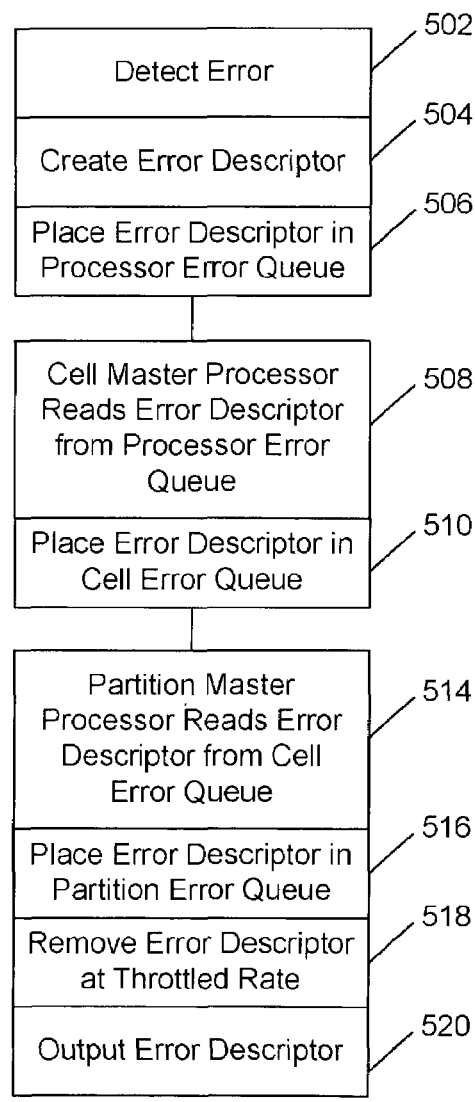
FIG. 5, is a flowchart of a error response routine for automatically handling errors.

FIG. 5 illustrates flow of error handling in an embodiment. In this embodiment, an error is detected 502 by firmware 402 executing on a processor, such as a processor 202 of a cell 104. In response to the error, the processor 202 creates 504 an error descriptor 306, including an error scope field and an error detail field; processor 202 places 506 the error descriptor 306 in processor error queue 404.

The error descriptor 306 is removed 508 from processor error queue 404 by cell master firmware 406 running on a cell master processor, and is placed 510 in cell error queue 408. The cell master processor may also insert additional, cell-level, errors into cell error queue 408. The error descriptor is next read 514 from the cell error queue 408 by master cell firmware executing on a master processor of the master cell 412 of the partition, and placed 516 in partition error queue 418. Error descriptors are removed 518 from the partition error queue at a throttled rate, and displayed 520.

While the forgoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow

What is claimed is:

1. A cellular computer system comprising:
  a plurality of cells, each cell of the plurality of cells further comprising
    a memory system,
    a plurality of processors coupled to the memory system,
    a system communication interface coupled to processors, and
    a cell error queue maintained by a processor within the memory system;
  wherein the system communication interface of a first cell of the plurality of cells is coupled to the system communication interface of a second cell of the plurality of cells; and
  wherein the first cell of the plurality of cells is a master cell; and wherein the master cell maintains a partition error queue and is capable of receiving into the partition error queue error descriptors from the cell error queue of the second cell of the plurality of cells.

2. The cellular computer system of claim 1, wherein the master cell incorporates an error filter and throttle, the error filter and throttle capable of reducing error descriptors reported by deleting low-priority error descriptors when large numbers of higher-priority error descriptors are present.

3. The cellular computer system of claim 1 wherein at least one cell further comprises a plurality of processor error queues maintained within memory system by processors of the cell; and wherein the cell error queue of the cell is capable of receiving error descriptors from the plurality of processor error queues.

4. The cellular computer system of claim 1 wherein there are a plurality of partitions, each having a master cell, and wherein each master cell of each partition maintains a partition error queue.

5. The cellular computer system of claim 4 wherein the cellular computer system is heterogeneous.

6. The cellular computer system of claim 5, wherein the master cell incorporates an error filter and throttle, the error filter and throttle capable of reducing error descriptors reported by deleting low-priority error descriptors when large numbers of higher-priority error descriptors are present.

7. The cellular computer system of claim 5 wherein at least one cell further comprises a plurality of processor error queues maintained within memory system by processors of the cell; and wherein the cell error queue of the cell is capable of receiving error descriptors from the plurality of processor error queues.

8. A method of error handling in a cellular computer system, wherein at least some errors are processed by steps comprising:
  detecting an error and creating an error descriptor;
  placing the error descriptor in a processor error queue;
  removing the error descriptor from the processor error queue and placing the error descriptor in a cell error queue;
  reading the error descriptor from the cell error queue and placing the error descriptor in a partition error queue;
  removing the error descriptor from the partition error queue at a throttled rate, and displaying the error descriptor.

9. The method of claim 8, wherein the error descriptor comprises an error scope field and an error detail field.

* * * * *